(12) United States Patent
Bixel

(10) Patent No.: US 10,133,245 B2
(45) Date of Patent: Nov. 20, 2018

(54) METHOD FOR PREDICTING AND MITIGATING POWER FLUCTUATIONS AT A PHOTOVOLTAIC POWER PLANT DUE TO CLOUD COVER

(71) Applicant: TMEIC Corporation, Roanoke, VA (US)

(72) Inventor: Paul S. Bixel, Salem, VA (US)

(73) Assignee: TMEIC Corporation, Roanoke, VA (US)

( * ) Notice: Subject to any disclaimer, the term of this patent is extended or adjusted under 35 U.S.C. 154(b) by 786 days.

(21) Appl. No.: 14/537,104

(22) Filed: Nov. 10, 2014

(65) Prior Publication Data

US 2015/0134251 A1 May 14, 2015

Related U.S. Application Data

(60) Provisional application No. 61/902,543, filed on Nov. 11, 2013.

(51) Int. Cl.
*G01W 1/10* (2006.01)
*G05B 13/04* (2006.01)
*G01W 1/12* (2006.01)

(52) U.S. Cl.
CPC ............... *G05B 13/04* (2013.01); *G01W 1/10* (2013.01); *G01W 1/12* (2013.01)

(58) Field of Classification Search
CPC ....................................................... G01W 1/10
See application file for complete search history.

(56) References Cited

U.S. PATENT DOCUMENTS

| 4,355,896 A | 10/1982 | Frosch et al. |
| 4,491,727 A | 1/1985 | Appelbaum et al. |
| (Continued) | | |

FOREIGN PATENT DOCUMENTS

| CN | 201104273 | 8/2008 |
| CN | 101969207 | 2/2011 |
| (Continued) | | |

OTHER PUBLICATIONS

Chow, Chi Wai et al., "Cloud motion and stability estimation for intra-hour solar forecasting," Solar energy 115 (2015) 645-655.
(Continued)

*Primary Examiner* — Sue A Purvis
*Assistant Examiner* — Suberr Chi
(74) *Attorney, Agent, or Firm* — New River Valley IP Law, P.C.; Michele L. Mayberry; Timothy D. Nolan

(57) ABSTRACT

A method for forecasting reduction in sunlight intensity due to cloud cover at a photovoltaic power plant is described. The method comprises determining characteristics of one or more clouds from sensors surrounding the photovoltaic power plant. The cloud characteristics are used to create a 3D map of the clouds. The 3D map in combination with information on the angle of the sun is used to create a 3D projection on the surface of the earth, resulting in a 2D surface irradiance map. The 2D surface irradiance map may be taken in successive projections or used in combination with wind speed data to forecast fluctuation in irradiance at the photovoltaic power plant. The forecasted reductions in power may be used to enact measures at the plant such as reducing the power output of inverters to prevent sudden fluctuations in the power output of the photovoltaic plant feeding the utility.

18 Claims, 4 Drawing Sheets

(56) References Cited

U.S. PATENT DOCUMENTS

| | | | |
|---|---|---|---|
| 4,994,981 | A | 2/1991 | Walker et al. |
| 6,133,990 | A | 10/2000 | Miller et al. |
| 7,414,706 | B2 | 8/2008 | Nichols et al. |
| 8,369,999 | B2 | 2/2013 | Beck |
| 8,437,959 | B2 | 5/2013 | Hoff |
| 8,467,208 | B1 | 6/2013 | Johns |
| 9,270,164 | B2 | 2/2016 | Bixel et al. |
| 2004/0135989 | A1 | 7/2004 | Klebe |
| 2005/0175253 | A1 | 8/2005 | Li et al. |
| 2007/0084502 | A1 | 4/2007 | Kelly et al. |
| 2009/0073541 | A1* | 3/2009 | Rabinowitz ............ F24J 2/1057 359/296 |
| 2010/0198420 | A1 | 8/2010 | Rettger et al. |
| 2011/0276269 | A1 | 11/2011 | Hummel |
| 2013/0073099 | A1* | 3/2013 | Bronicki ................. G01W 1/10 700/287 |
| 2014/0083413 | A1* | 3/2014 | Bibi ........................ G01W 1/02 126/601 |
| 2014/0376289 | A1 | 12/2014 | Bixel et al. |
| 2015/0102674 | A1 | 4/2015 | Rudolph et al. |
| 2015/0177415 | A1* | 6/2015 | Bing ...................... H02S 50/00 702/3 |
| 2016/0190810 | A1* | 6/2016 | Bhavaraju ............... H02J 3/383 307/20 |

FOREIGN PATENT DOCUMENTS

| | | |
|---|---|---|
| CN | 101969207 A | 2/2011 |
| CN | 102244483 | 11/2011 |
| CN | 102244483 A | 11/2011 |
| CN | 102915470 | 2/2013 |
| CN | 102915470 A | 2/2013 |
| CN | 103116711 | 5/2013 |
| CN | 103116711 A | 5/2013 |
| ES | 2257914 | 8/2006 |
| JP | S60220843 | 11/1985 |
| JP | 2007184354 | 7/2007 |
| JP | 2007184354 A | 7/2007 |
| JP | 2009252940 | 10/2009 |
| JP | 201086840 | 8/2010 |
| JP | 2010186840 A | 8/2010 |
| JP | 2011159199 | 8/2011 |
| WO | 0113145 A | 2/2001 |
| WO | 2007047048 A2 | 4/2007 |
| WO | 2011017323 A1 | 2/2011 |
| WO | 2011124720 A2 | 10/2011 |
| WO | 2011129473 | 10/2011 |
| WO | 2011129473 A1 | 10/2011 |
| WO | 2011140565 A1 | 11/2011 |
| WO | 2011152448 | 12/2011 |
| WO | 2011152448 A1 | 12/2011 |
| WO | 2012146618 | 11/2012 |
| WO | 2012146618 A1 | 11/2012 |
| WO | 2013124432 | 8/2013 |
| WO | 2013124432 A1 | 8/2013 |
| WO | 2013124421 A9 | 12/2013 |

OTHER PUBLICATIONS

Gohari, S.M.I. et al., "Comparison of solar power output forecasting performance of the Total Sky Imager and the University of California, San Diego Sky Imager," Energy Procedia 49 (2014) 2340-2350.

Marquez, Ricardo et al., "Intra-hour DNI forecasting based on cloud tracking image analysis," Solar Energy 91 (2013) 327-336.

Quesada-Ruiz, S., et al., "Cloud-tracking methodology for intra-hour DNI forecasting Solar Energy," 102 (2014) 267-275.

Urquhart, Bryan et al., "Towards Intra-Hour Solar Forecasting Using Two Sky Imagers at a Large Solar Power Plant," University of California, San Diego, Jun. 2012, 6 pages.

B. Thurairajah et al., "Cloud Statistics Measured With the Infrared Cloud Imager (ICI)", IEEE Transactions on Geoscience and Remote Sensing, vol. 43, No. 9, Sep. 2005, pp. 2000-2007.

C. Sivaraman and J. Comstock, "Micropulse Lidar Cloud Mask Value-Added Product Technical Report", Jul. 2011, ARM Climate Research Facility, 12 pages.

J. Carter et al., "Lidar 101: An Introduction to LIDAR Technology, Data, and Applications, National Oceanic and Atmospheric Administration", Nov. 2012, Charleston, SC, 76 pages.

Clothiaux et al., Objective determination of cloud heights and radar reflectivities using a combination of active remote sensors at ARM CART sites, J. Appl. Meteor. vol. 39, pp. 645-665, 2000.

Genkova et al., Assessing Cloud Spatial and Vertical Distribution with Infrared Cloud Analyzer, Fourteenth ARM Science Team Meeting Proceedings, Albuquerque, New Mexico, Mar. 22-26, 2004, 8 pages.

I. Reda and A. Andreas, "Solar Position Algorithm for Solar Radiation Applications," National Renewable Energy Laboratory, 2008, 56 pages.

Mace et al., Cirrus layer microphysical properties derived from surface-based millimeter radar and infrared interferometer data, Journal of Geophysical Research: Atmospheres, vol. 103, Issue D18, pp. 23207-23216, 1998.

Reda, I. and Andreas, A., Solar Position Algorithm for Solar Radiation Applications, Solar Energy. vol. 76(5), pp. 577-589, 2004.

U.S. Appl. No. 13/921,788, filed Jun. 19, 2013, Published as US 2014/0376289 on Dec. 25, 2014, 23 pages.

U.S. Appl. No. 14/050,928, filed Oct. 10, 2013.

Uttal et al., Cloud boundary statistics during FIRE II, J. Atmos., Sci., vol. 52, pp. 4276-4284, 1995.

Wang and Sassen, Cirrus Cloud Microphysical Property Retrieval Using Lidar and Radar Measurements. Part II: Midlatitude Cirrus Microphysical and Radiative Properties. J. Atmos. Sci., vol. 59, pp. 2291-2302, 2002.

Wang and Sassen, Cloud Type and Macrophysical Property Retrieval Using Multiple Remote Sensors, Journal of Applied Meteorology, vol. 40, pp. 1665-1682, 2001.

* cited by examiner

METHOD FOR PREDICTING AND MITIGATING POWER FLUCTUATIONS AT A PHOTOVOLTAIC POWER PLANT DUE TO CLOUD COVER

CROSS-REFERENCE TO RELATED APPLICATIONS

The present application relies on the disclosure of and claims priority to and the benefit of the filing date of U.S. Provisional Application No. 61/902,543, filed Nov. 11, 2013, the disclosure of which is hereby incorporated by reference herein in its entirety.

BACKGROUND OF THE INVENTION

Field of the Invention

The present invention relates to the operation of photovoltaic power plants. More particularly, the present invention relates to methods, computer program products, controllers and systems for forecasting fluctuations in irradiance over a photovoltaic power plant due to cloud cover and enacting measures at the photovoltaic power plant in response to the forecasted fluctuations.

Description of Related Art

Renewable energy sources like solar power plants are subject to unpredictable power output due to changes in the environment in their vicinity. Chief among these are the movement of clouds which can rapidly cause their power output to fluctuate. As the percentage of power from such plants supplied to the public power grid increases the severity of the problem also increases. Recently power utilities are demanding that new solar power plants be designed with features to prevent their output from changing faster than a specified rate. Inadequate measures to address this issue can result in rapid voltage fluctuations in power grids that may produce a phenomenon known as "flicker"—rapid noticeable changes of energy being supplied, such as rapid visible changes in the light level provided by lighting equipment.

There are two methods to meet these new requirements. The first and most common approach is to include some type of energy storage or generation capability within the scope of the power plant. These include battery systems or diesel generators which can supplement the power produced by the plant when cloud events occur such that the power out remains within the required specifications sets. While technically straight forward this approach severely affects the economic viability of the project due to the high cost of batteries or resistance to application of diesel generators.

The second and less common approach is to forecast weather in such a way that the output of the plant can be gradually changed in advance of when cloud cover would appear. Approaches that have been attempted include mounting sensors around the periphery of the plant or in locations remote from the plant in an attempt to predict when cloud cover is imminent. The problem with this approach is that sensors near the plant cannot give enough advance notice and sensors remote from the plant would be expensive to install and difficult to communicate with.

Various efforts have been made to address this issue or factors related to this issue, including those described in U.S. Pat. Nos. 4,491,727; 6,133,990; 4,355,896; 7,414,706; 8,369,999; and 8,437,959; and International Patent Application Publication Nos. WO 2011/017323 A1; WO 2011/124720 A1; WO 2011/152448 A1; WO 2012/146618 A1; WO 2011/129473 A1; WO 2007/047048 A1; and WO 2013/124421 A1; and US Patent Application Publication Nos. 2010/0198420 A1; 2004/0135989 A1; 2005/0175253 A1; 2007/0084502 A1; and 2011/0276269 A1; as well as Japanese Patent Application Publication Nos. JP 2007184354 A; JP 2010186840 A; JP 2009252950 A; JP 2011159199 A; JP S60220843 A; as well as Chinese Patent Application Publication Nos. CN 102915470 A; CN 101969207 A; CN 102244483 A; CN 201104273 Y; CN 103116711 A; as well as Spanish Patent Application Publication No. 2257914 A1. However, despite these efforts, there still remains a need in the art to forecast power fluctuations at photovoltaic power plants caused by cloud phenomenon.

SUMMARY OF THE INVENTION

To this end, the present invention provides methods, computer program products, controllers, and systems for tracking changes in sunlight intensity due to cloud cover in the vicinity of a solar power plant. Solar power plant output is greatly affected by cloud cover and rapidly moving clouds can cause large and undesirable fluctuations in the output of the power plant. In embodiments, the invention may use one or more sensors to determine one or more characteristics of clouds in the vicinity of the sensor(s). The characteristics may include the range, azimuth, elevation, and altitudes of the clouds with respect to the sensor. Embodiments include determination of characteristics based on color, type, distance or temperature. Embodiments may also include determination of other factors such as cloud height and width. One or more of these characteristics are used to create a three-dimensional (3D) representation of the clouds in the vicinity of the sensors.

Using the 3D representation of the clouds, data on the elevation and azimuth of the sun corresponding to the sensor(s) can be used to create a 2D projection on the surface of the earth which indicates the intensity or irradiance of sunlight striking the surface. Wind speed and/or successive projections taken over time can be used to estimate the speed of the projection and thus estimate when the projection will overlap the solar plant and how severe the impact on the output of the solar plant will be. Advanced knowledge on future reductions in irradiance allows the operation of the solar plant to be modified to prevent sudden changes in its power output.

An embodiment of the invention includes a method for forecasting a fluctuation in the solar irradiance at a photovoltaic power plant due to cloud cover, comprising receiving machine-readable data on one or more clouds from one or more sensors within a radius of a photovoltaic power plant, retrieving machine-readable data from a database on the elevation and azimuth of the sun corresponding to each location of the one or more sensors, determining, through the machine-readable data received from the one or more sensors, horizontal velocities and one or more three-dimensional (3D) characteristics of one or more target clouds in the vicinity of the sensors, creating a 3D map of the one or more target clouds through the one or more 3D characteristics, projecting a two-dimensional (2D) surface irradiance map within the radius of the photovoltaic power plant by combining the three-dimensional map and machine-readable data on the elevation and azimuth of the sun, and forecasting a fluctuation in the surface irradiance of the photovoltaic power plant over a time interval based on the 2D map and horizontal velocities, wherein at least one of the determining, creating, projecting, and forecasting steps are carried out through a processor. In embodiments, a horizontal velocity of the two-dimensional surface irradiance map can be computed by comparing two of more successive maps, such as by determining the amount of time it takes for one map to move to another position, i.e., second map spaced a certain distance from map one.

Another embodiment of the invention includes a computer-readable medium including instructions that, when executed on a computer, cause a computer to receive machine-readable data on one or more clouds from one or more sensors within a radius of a photovoltaic power plant, retrieve machine-readable data from a database on the elevation and azimuth of the sun corresponding to each location of the one or more sensors, determine, through the machine-readable data received from the one or more sensors, horizontal velocities and one or more 3D characteristics of one or more target clouds in the vicinity of the sensors, create a 3D map of the one or more target clouds through the one or more 3D characteristics, project a 2D surface irradiance map within the radius of the photovoltaic power plant by combining the 3D map and machine-readable data on the elevation and azimuth of the sun, and forecast a fluctuation in the surface irradiance of the photovoltaic power plant over a time interval based on the 2D map and horizontal velocities.

Another embodiment of the invention is a photovoltaic power plant controller device comprising at least one processor, a form of computer-readable memory, and a set of computer-executable instructions configured to receive machine-readable data on one or more clouds from one or more sensors within a radius of a photovoltaic power plant, retrieve machine-readable data from a database on the elevation and azimuth of the sun corresponding to each location of the one or more sensors, determine, through the machine-readable data received from the one or more sensors, horizontal velocities and one or more 3D characteristics of one or more target clouds in the vicinity of the sensors, create a 3D map of the one or more target clouds through the one or more 3D characteristics, project a 2D surface irradiance map within the radius of the photovoltaic power plant by combining the 3D map and machine-readable data on the elevation and azimuth of the sun, forecast a fluctuation in the surface irradiance of the photovoltaic power plant over a time interval based on the 2D map and horizontal velocities, and adjust the power output of the photovoltaic plant based on the forecasted decrease of surface irradiance at the photovoltaic power plant.

Another embodiment of the invention is a system comprising the photovoltaic power plant controller device of the invention comprising one or more inverters in a two-way communication with the photovoltaic power plant controller through a network.

In any embodiment of the invention, the fluctuation may be a temporary decrease in the surface irradiance of the photovoltaic power plant.

In any embodiment of the invention, an amplitude, a rate of onset, and a rate of offset of the decrease may be forecasted.

In any embodiment of the invention, the amplitude of the decrease in surface irradiance that may be forecasted may be in the range of 1%-99%.

In any embodiment of the invention, the rate of onset of the decrease in surface irradiance that may be forecasted may be in the range of 1%/minute-99%/minute.

In any embodiment of the invention, the rate of offset of the decrease in surface irradiance that may be forecasted may be in the range of 1%/minute-99%/minute.

In any embodiment of the invention, the power output of the photovoltaic plant may be adjusted based on the forecasted decrease and/or increase of surface irradiance at the photovoltaic power plant.

In any embodiment of the invention, adjusting the power output of the photovoltaic plant may comprise sending a command to one or more inverters at the photovoltaic power plant, such as to a plurality of inverters.

In any embodiment of the invention, the command to the inverters may be configured to decrease the power output of one or more inverters in anticipation of a decrease in solar irradiance at the photovoltaic power plant. In embodiments, for example, the individual inverter command can be determined by dividing the total decrease in power output needed by the total number of operating inverters.

In any embodiment of the invention, the command to the inverters may be configured to increase the power output of the inverters in anticipation of an increase in solar irradiance at the photovoltaic power plant.

In any embodiment of the invention, the one or more sensors may be LIDAR, RADAR, or infrared sensors.

In any embodiment of the invention, the one or more 3D characteristics may include a range, altitude, elevation, or azimuth of a target cloud.

In any embodiment of the invention, one of the sensors may be an anemometer and the horizontal velocity of the one or more clouds may be determined through the wind speed and direction measured by the anemometer.

In any embodiment of the invention, the one or more sensors may be within a radius of 0.1 miles to 200 miles of the photovoltaic power plant.

In any embodiment of the invention, the one or more clouds may be within a radius of 0.1 miles to 200 miles of the photovoltaic power plant.

In any embodiment of the invention, the one or more characteristics may include macrophysical properties of the clouds.

In any embodiment of the invention, the macrophysical properties may be for example cloud base height, cloud width, cloud fraction, cloud top height, cloud density, and cloud type, or any other macrophysical characteristic.

In any embodiment of the invention, the cloud type may be one or more of cumulus, stratocumulus, stratus, altocumulus, altostratus, nimbostratus, cirrus, cirrocumulus, cumulonimbus, cirrostratus, and deep convective clouds, for example.

In any embodiment of the invention, the one or more sensors may determine one or more microphysical properties of the one or more clouds.

In any embodiment of the invention the microphysical properties may be cloud phase, optical depth, particle size, and density.

In any embodiment of the invention, the optical depth of the cloud may be used to forecast the fluctuation in the surface irradiance of the photovoltaic power plant.

BRIEF DESCRIPTION OF THE DRAWINGS

The accompanying drawings illustrate certain aspects of embodiments of the present invention, and should not be used to limit or define the invention. Together with the written description the drawings serve to explain certain principles of various embodiments of the invention.

DETAILED DESCRIPTION OF VARIOUS EMBODIMENTS OF THE INVENTION

Figure 1:
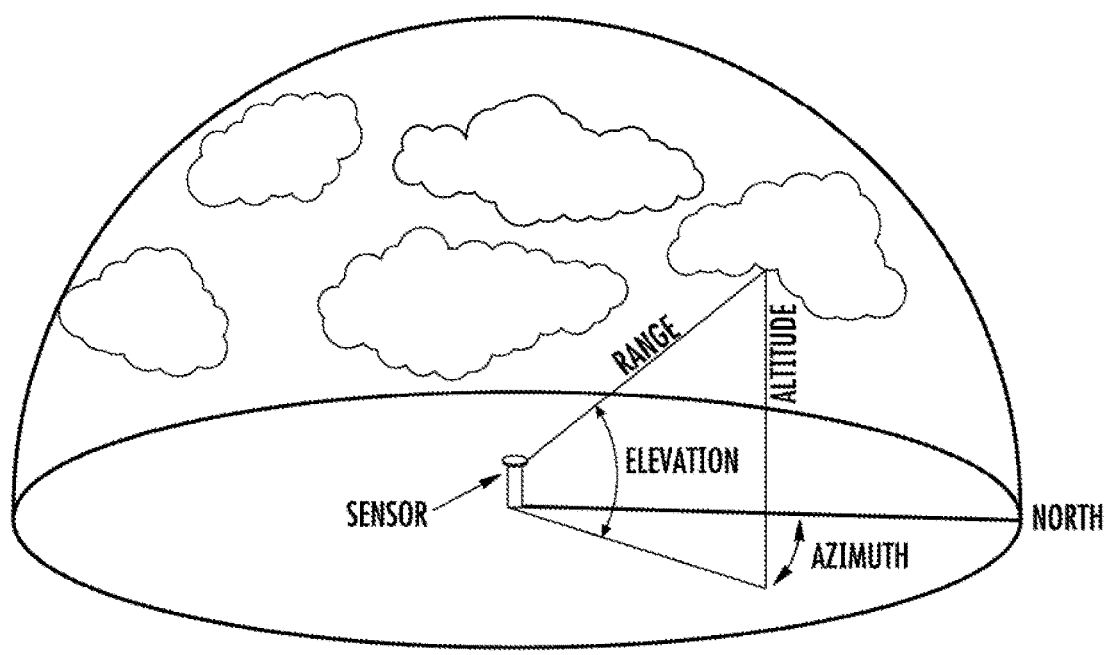
FIG. 1 is a diagram showing a sensor for detecting one or more cloud characteristics such as range, elevation, altitude, and azimuth according to an embodiment of the invention.

Reference will now be made in detail to various exemplary embodiments of the invention. It is to be understood that the following discussion of exemplary embodiments is not intended as a limitation on the invention. Rather, the following discussion is provided to give the reader a more detailed understanding of certain aspects and features of the invention.

3D Cloud Map

In order to obtain a map of the surface irradiance one or more remote sensors are used to construct a three dimensional representation of clouds in their vicinity. The sensor(s) may detect one or more features of the clouds, including the angle of the clouds from the horizon and the azimuth of the clouds from north. In addition, the remote sensors may detect information about the altitude in order to create a 3D map.

The remote sensors may be active sensors or passive sensors. In the context of this specification, passive sensors detect radiation that is generated by an external source of energy, such as the sun, while active sensors generate and direct energy toward a target and subsequently detect the radiation.

Embodiments of active sensors that may be used in the invention include LIDAR and RADAR. RADAR is an active remote sensing technology for detecting objects based on the transmission and reflection of radio signals that is well known in the art. In embodiments of cloud measurement applications, vertically-oriented cloud millimeter-wave radar sensors may scan in the Ka-Band (26.5 to 40 GHz, and optimally around 35.5 GHz) or W-band (75 to 110 GHz, and optimally 94 GHz). LIDAR is an active remote sensing technology that operates similar to RADAR except that it emits intense, focused beams of light and measure the time it takes for the reflections to be measured by a sensor. Embodiments of LIDAR cloud measurement applications may employ light in the ultraviolet, visible, or near infrared spectrum (wavelengths in the range of 10 µM to 250 nm). The reflected light (called backscatter) is subsequently used to compute a range, or distance, to a cloud. Three-dimensional coordinates including latitude, longitude, and elevation of a cloud may be computed from the time difference between the laser pulse being emitted and returned, the angle at which the pulse was emitted, and the absolute location of the sensor on the surface of the Earth. Examples of specific types of LIDAR systems that may be used in embodiments of the invention may be those used for measurement of cloud altitude include Micropulse LIDAR and Raman LIDAR Ceilometers. Additionally, embodiments may combine the use of microwave RADAR and LIDAR with cloud detection algorithms. A general cloud detection algorithm for separating clouds from noise and aerosol signals has been described (See Wang and Sassen, Cloud Type and Macrophysical Property Retrieval Using Multiple Remote Sensors, Journal of Applied Meteorology, 40:1665-1682, 2001 ("Wang and Sassen, 2001")) and may be used in the present invention.

Although LIDARS are generally sensitive enough to detect any cloud in the troposphere, they often cannot penetrate through thick low and midlevel clouds to reach cloud top or sample mid- and high-level clouds because of optical attenuation (See Wang and Sassen, 2001; Clothiaux et al., Objective determination of cloud heights and radar reflectivities using a combination of active remote sensors at ARM CART sites, J. Appl. Meteor. 39, 645-665 (See Clothiaux et al., 2000)). Further, while RADAR can penetrate low clouds to detect many middle and high clouds, as well as provide RADAR echo cloud base and top, RADAR echo signals may be contaminated by insects, birds, or precipitation, or may fail to detect clouds with small particles (See Wang and Sassen, 2001). In view of this, embodiments of the invention may include the combination of LIDAR and RADAR to determine cloud boundaries. General principles of combining LIDAR and RADAR to determine cloud boundaries have been described (See Wang and Sassen, 2001; Clothiaux et al., 2000; Uttal et al., Cloud boundary statistics during FIRE II, J. Atmos., Sci., 52, 4276-4284).

Embodiments may alternatively or in addition include the use of infrared sensors to detect cloud height. Infrared is a passive remote sensing technology that detects the temperature of the cloud. One example of a method for determining the height of a cloud through infrared sensing is provided in International Patent Application Publication No. WO 01/13145A1. Briefly, an infrared lens is used to record an infrared image of the sky which is converted into a temperature image through calibration against a temperature standard, so that the temperature image indicates the density and distribution of the cloud. The height of the cloud can then be determined by comparing the temperature image to the temperature profile of the air below the cloud. Additionally, cloud base height measurement through infrared sensors (OMEGA OS 65-V-R2-4-BB model pyrometers) has been demonstrated (See I. Genkova et al., Assessing Cloud Spatial and Vertical Distribution with Infrared Cloud Analyzer, Fourteenth ARM Science Team Meeting Proceedings, Albuquerque, N. Mex., Mar. 22-26, 2004).

Additional embodiments include the use of visual sensors in combination with pattern recognition techniques to classify clouds according to type, such as cumulus, cirrus, stratus, etc. These pattern recognition techniques may include supervised and unsupervised classification, image segmentation and scale context, and neural networks. In addition, embodiments may include the use of algorithms to classify cloud types based on ground-based active and passive remote sensing technology such as that developed by Wang and Sessen (See Wang and Sassen, 2001). The altitude of the cloud can then be estimated based on the known properties of these clouds types.

A cloud that is the object of a remote sensor in this invention may be referred to herein as a "target cloud." Embodiments of the invention include the calculation of the 3D coordinates of a cloud using one or more of the remote sensors through either the direct measurement or calculation of a range, altitude, elevation, and azimuth of a target cloud. As used herein, "range" is the distance of a target cloud to a sensor, "altitude" is the vertical distance of a cloud above the surface of the earth, "elevation" is the angular distance of a target cloud above the horizon, and "azimuth" is the angle along the horizon of a target cloud with respect to a particular sensor's relationship with geographic north, with zero degrees corresponding to North, and increasing in a clockwise fashion. Thus, 90 degrees is East, 180 degrees is South, and 270 degrees is West. These concepts are illustrated in FIG. 1. These characteristics are shown for one cloud, although the present invention may make these determinations for any one or more, or all clouds within the range of the sensor(s).

The one or more remote sensors may take measurements of the clouds through angular measurements or vertical measurements, or both. Embodiments may include the measurement of the range of a cloud with respect to two sensors such as LIDAR or RADAR or both through a combination of angular and vertical measurements and triangulation of the 3D coordinates of the cloud and calculation of the altitude, elevation, and azimuth of the target cloud through the measurements. It is within the capability of a skilled artisan to determine the 3D coordinates of a cloud through one or more remote sensors such as LIDAR, RADAR, or infrared.

Embodiments of the invention include characterization by remote sensors of the macrophysical properties of clouds, including cloud base height, cloud width, cloud fraction, cloud top height, and cloud type. As used herein "cloud base height" for a given cloud or cloud layer, is the lowest level of the atmosphere where cloud properties are detectable, "cloud fraction" is the fraction of sky covered by clouds, observed directly or derived from irradiance data, "cloud top height" is the highest level of the atmosphere where cloud properties are detectable for a given cloud or cloud layer. Cloud type may include, without limitation, cumulus, stratocumulus, stratus, altocumulus, altostratus, nimbostratus, cirrus, cirrocumulus, cumulonimbus, cirrostratus, and deep convective clouds.

Embodiments of the invention may also include the use of one or more remote sensors to characterize the microphysical properties of clouds, including cloud phase (ice, water, mixed), optical depth (transparency), particle size, and density. From such measurements, the radiative properties of clouds may be inferred. Algorithms for calculating cloud microphysical and radiative properties from LIDAR, RADAR, infrared, or their combination are available and can be used in various embodiments of the invention (for example, See Wang and Sassen, 2002: Cirrus Cloud Microphysical Property Retrieval Using Lidar and Radar Measurements. Part II: Midlatitude Cirrus Microphysical and Radiative Properties. J. Atmos. Sci., 59, 2291-2302; Mace et. al, 1998, Cirrus layer microphysical properties derived from surface-based millimeter radar and infrared interferometer data, Journal of Geophysical Research: Atmospheres, Volume 103, Issue D18, pages 23207-23216).

Embodiments of the invention include characterization by remote sensors of clouds of any cloud type with respect to cloud macrophysical properties, cloud microphysical properties, cloud velocity, cloud expansion or contraction information, precipitation, and dew point information.

The one or more remote sensor(s) may be placed in the vicinity of a photovoltaic power plant. Embodiments of the invention include placement of one or more remote sensor(s) within a radius of 0.1 miles, 0.25 miles, 0.5 miles, 1 mile, 2 miles, 3 miles, 4 miles, 5 miles, 8 miles, 10 miles, 15 miles, 20 miles, 25 miles, 30 miles, 50 miles, 75 miles, 100 miles, 150 miles, or 200 miles of a photovoltaic power plant. Further, embodiments may include placement of at least one remote sensor in a location that, based on historical wind measurements, is commonly upwind from the photovoltaic plant and in the vicinity of the power plant, for example, within a radius of 1 mile surrounding the photovoltaic cells. Placement of at least one remote sensor upwind allows for creation of a 3D cloud map upwind from the photovoltaic power plant.

Through calculation of the 3D coordinates of the clouds in the vicinity, the one or more remote sensors may be used to create a 3D cloud map. The invention may use additional methods of creating a 3D cloud map, including those described in International Patent Application Publication No. WO 2011/129473A1 ("Automatic Sky State Observation System and Method"), and WO 2013/124432A1 ("System and Method for the Three-dimensional Mapping of the Cloudiness of the Sky").

Angle of the Sun

Embodiments of the invention may include the use of information on the angle of the sun relative to each sensor. This can be inferred from almanac data based on the geographic position of each sensor on the surface of the earth. Solar azimuth versus elevation tables according to month, day and the time of day at the time of the measurement are available for particular geographic coordinates and cities, and can be stored in and retrieved from a database. A web-based sun altitude/azimuth table is available for more than 22,000 locations in the United States through the US Navy Astronomical Applications Dept. (see http://aa.usno-.navy.mil/data/docs/AltAz.php) and an algorithm of computing the solar position anywhere on the surface of the earth is also available (see http://www.nrel.gov/midc/spa/). This algorithm calculates the solar zenith and azimuth angles in the period from the year −2000 to 6000, with uncertainties of +/−0.0003 degrees based on the date, time, and location on Earth. Any solar position algorithm can be used in embodiments of the invention to derive a 2D projection of the clouds on the earth. (See also Reda, I.; Andreas, A., Solar Position Algorithm for Solar Radiation Applications, Solar Energy. Vol. 76(5), 2004; pp. 577-589).

3D Projection to Create 2D Surface Irradiance Map

Using the angle of sun and the cloud map a 3D projection can be made which will result in a 2D surface irradiance map. Information about the altitude and opacity of the clouds can be used to vary sunlight irradiance over the irradiance map.

Figure 2:
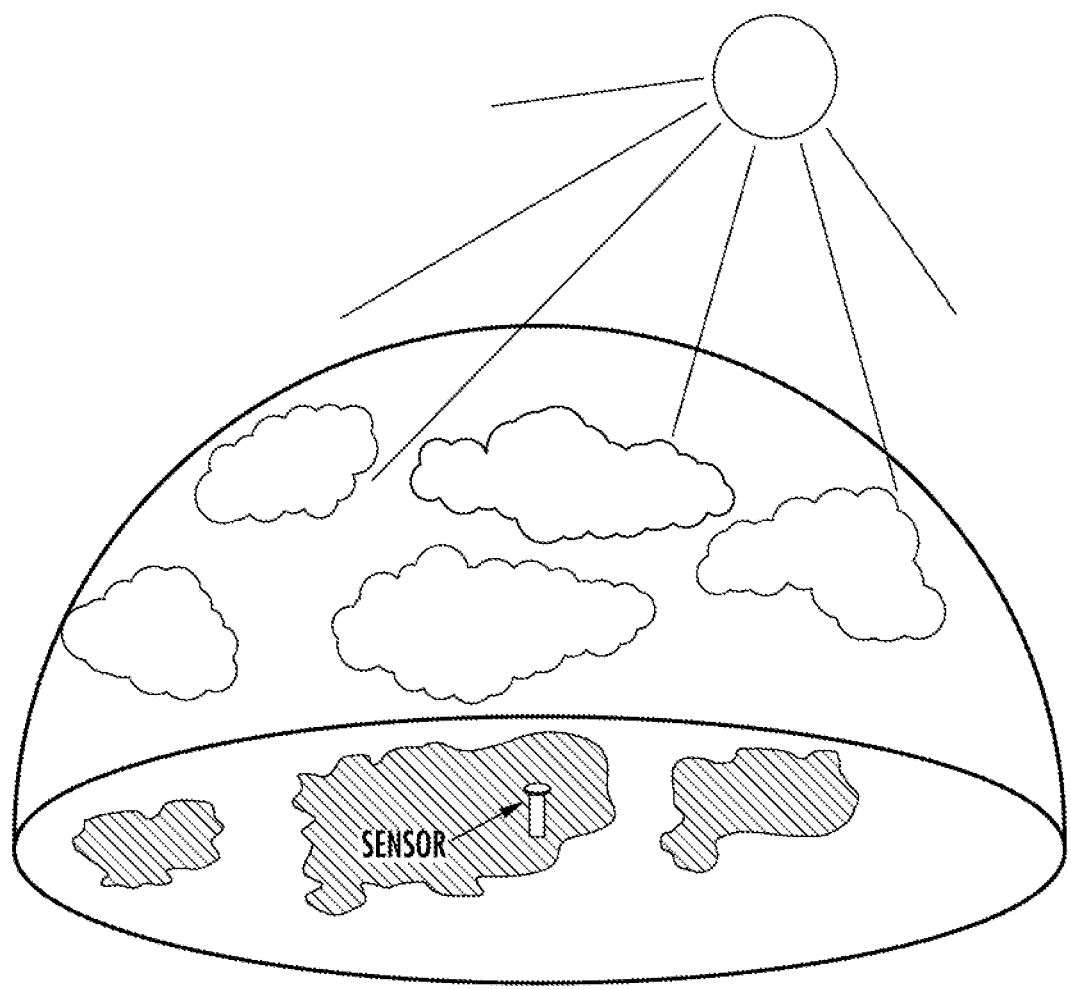
FIG. 2 is a diagram showing a sensor for detecting reduced irradiance according to an embodiment of the invention.

FIG. 2 shows a 2D projection of the shadows on the earth which would result from the cloud formation shown in FIG. 1. The intensity of the shadows, or the 2D surface irradiance map can be determined by combining the three-dimensional map and machine-readable data on the elevation and azimuth of the sun. Accurate 2D maps can be derived using ray-tracing concepts commonly used in gaming technology. A sunlight (ray tracing) modeling simulation can be used to show how the sun travels through space, bends around object, and passes through clouds to otherwise make shadows on the surface of the ground and/or on the surface of photovoltaic cells. For example, Houdini, OptiX, POV-Ray, Radiance, Shade, and Sunflow are just some of the many available 3D graphics software that can be used to produce a 2D irradiance map.

Successively created 2D maps alone or in combination with information obtained on the horizontal velocity of a cloud or from wind speed and direction gathered from an anemometer can be used to project the 2D projection in time over the surface of the earth and so estimate the time that any variation in solar irradiance could occur within the perimeter of the solar plant, especially over the photovoltaic cells. Further, additional measurements of wind speed and direction from altitudes at cloud level may be obtained from publically available weather data gathered from weather balloons. Using this information operational decisions can be made to gradually reduced the power output of the plant such that when fluctuations in ground irradiance occur over the photovoltaic cells no sudden change in power output will occur.

Figure 3:
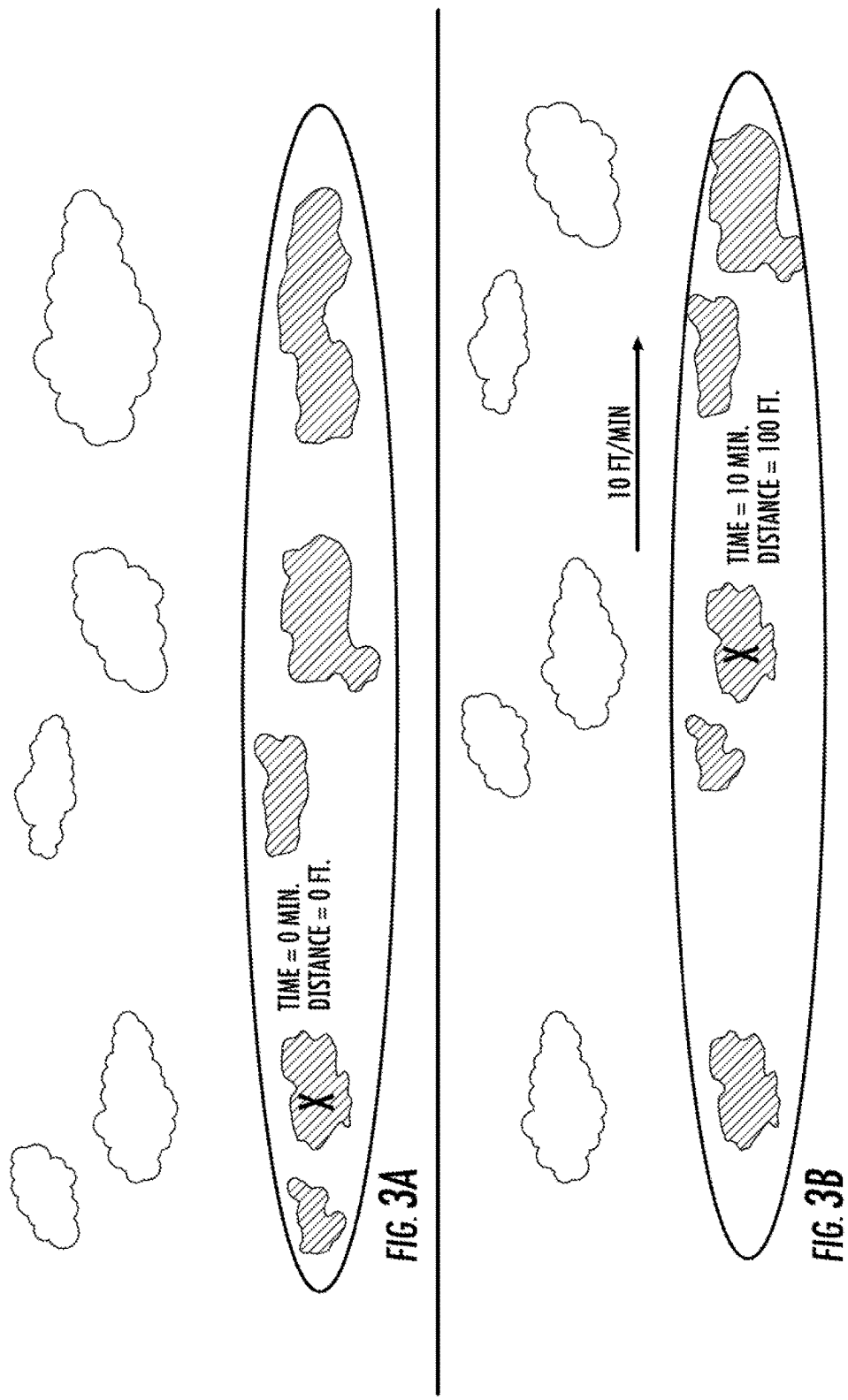
FIGS. 3A and 3B are diagrams showing calculation of cloud speed based on transit time and distance according to an embodiment of the invention.

Embodiments may also include the calculation of a horizontal velocity of a target cloud or shadow of a target cloud based on wind speed data or data from the one or more sensors. For example, as shown in FIG. 3A, a sensor may calculate a first position of a cloud at a time=zero and distance=zero. In FIG. 3B, the sensor or another sensor, or projections from wind speed and direction data may calculate a second distance of a target cloud at a time of 10 minutes and a distance of 100 feet, resulting in a velocity of a target cloud of 10 feet per minutes in a direction of 90° (due East). Further, by knowing the velocity of a target cloud, the velocity of other clouds in its vicinity can be surmised. As used herein, "velocity" is given its art-recognized definition of a vector physical quantity characterized by both magnitude and direction.

The 3D cloud map may be created from the input of the one or more remote sensors by a group of computer-executable instructions that may be organized into routines, subroutines, procedures, objects, methods, functions, or any other organization of computer-executable instructions that is known or becomes known to a skilled artisan in light of this disclosure, where the computer-executable instructions are configured to direct a computer or other data processing device to perform one or more of the specified processes and operations. The instructions may then combine the 3D cloud map with almanac information stored in a database to create a 3D projection that will result in a two dimensional surface irradiance map. The instructions may further combine the two dimensional surface irradiance map with wind speed to predict the sunlight intensity of a photovoltaic power plant.

Figure 4:
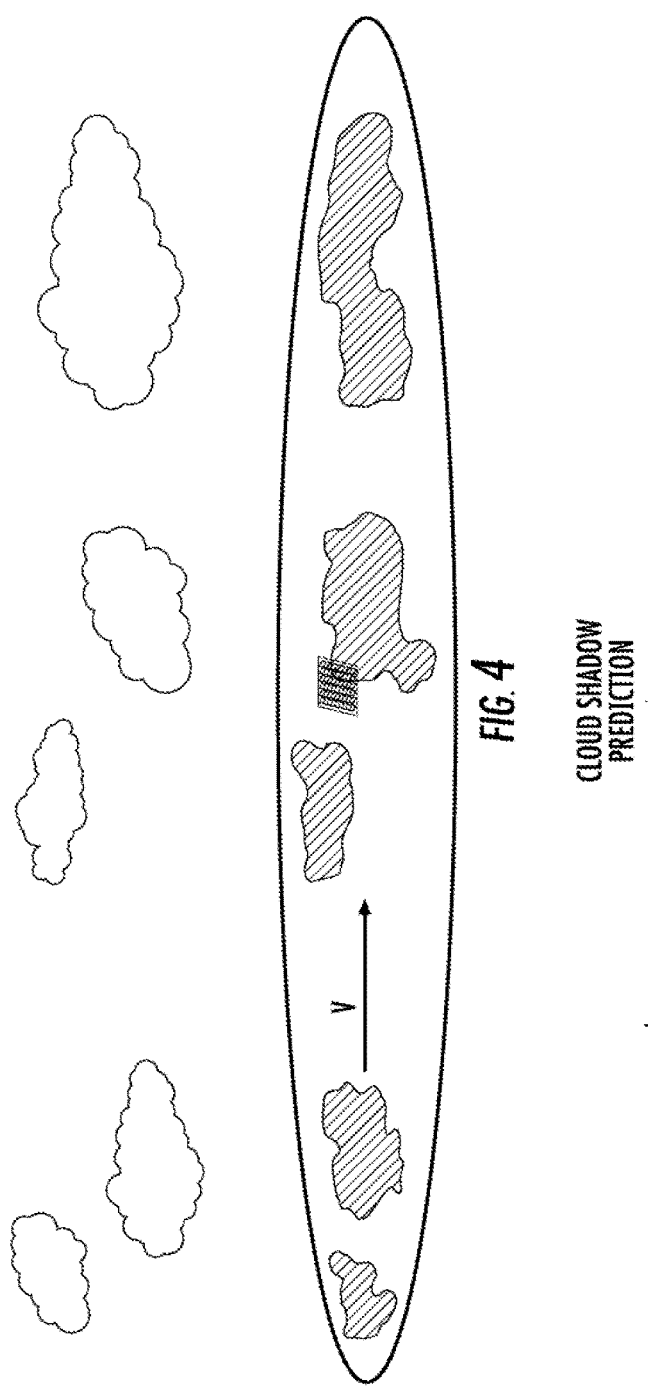
FIG. 4 is a diagram showing a 2D irradiance map projection according to an embodiment of the invention.

FIG. 4 shows a 2D surface irradiance map projected within a radius of a photovoltaic power plant. The 2D surface irradiance map may be projected over a radius of 1 mile, 2 miles, 3 miles, 4 miles, 5 miles, 8 miles, 10 miles, 15 miles, 20 miles, 25 miles, 30 miles, 50 miles, 75 miles, 100 miles, 150 miles, or 200 miles of a photovoltaic power plant. Also shown is cloud movement at velocity V calculated from cloud measurements or wind speed and direction measurements.

Figure 5:
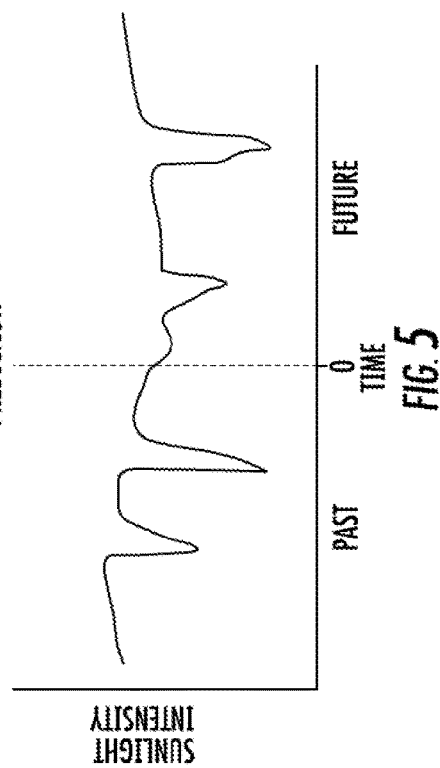
FIG. 5 is a graph showing prediction of sunlight intensity based on the 2D irradiance map projection of FIG. 4 according to an embodiment of the invention.

FIG. 5 shows a graphical output of the method of the invention for predicting fluctuations in sunlight intensity over the photovoltaic power plant based on the 2D surface irradiance map. The graphical output may be a plot of sunlight intensity over time, including past, present, and future as shown. The graphical output may project the sunlight intensity over the photovoltaic power plant 1 minute, 2 minutes, 5 minutes, 10 minutes, 15 minutes, 20 minutes, 30 minutes, 45 minutes, 60 minutes, 90 minutes, 120 minutes, 180 minutes, 240 minutes, or 300 minutes or more into the future based on the projected 2D surface irradiance map and the determination of the velocity of cloud movement.

The predicted fluctuations in surface irradiance, or sunlight intensity, at a photovoltaic plant may be temporary decreases in surface irradiance at a photovoltaic power plant. Embodiments of the invention may forecast an amplitude, rate of onset and rate of offset of a temporary decrease in surface irradiance. Exemplary amplitudes may include a 1% decrease, 2% decrease, 5% decrease, 10% decrease, 15% decrease, 20% decrease, 25% decrease, 30% decrease, 35% decrease, 40% decrease, 45% decrease, 50% decrease, 60% decrease, 70% decrease, 80% decrease, 90% decrease, 95% decrease, or 99% decrease at the photovoltaic plant. The rates of onset and offset of the surface irradiance or sunlight intensity may be over short intervals such as a few minutes or longer intervals such as a few hours. Thus, rates of onset and offset may be expressed as an increase or decrease in surface irradiance or sunlight intensity/minute or /hour. Exemplary onsets and offsets include a 1%, 5%, 10%, 20% 25%, 30%, 40%, 50%, 60%, 75%, 80%, 90%, or 99% decrease (or increase, upon passage of the cloud) per minute or per hour. Additionally, rates of onsets or offsets in the decrease in surface irradiance may not be necessary be linear, and may occur according to biphasic, triphasic, or quadriphasic dynamics, nor may a rate of onset upon approach of a cloud over a photovoltaic plant be the same as a rate of offset upon passage of a cloud over the plant. The predicted fluctuations will depend on the properties of the cloud determined by the sensors.

Computer-Readable Medium

Embodiments of the invention also include a computer readable medium comprising one or more computer files comprising a set of computer-executable instructions for performing one or more of the calculations, processes, and operations described and/or depicted herein. In exemplary embodiments, the files may be stored contiguously or non-contiguously on the computer-readable medium. Further, embodiments of the invention include a computer program product comprising the computer files, either in the form of the computer-readable medium comprising the computer files and, optionally, made available to a consumer through packaging, or alternatively made available to a consumer through electronic distribution. As used herein, a "computer-readable medium" includes any kind of computer memory such as floppy disks, conventional hard disks, CD-ROMS, Flash ROMS, non-volatile ROM, electrically erasable programmable read-only memory (EEPROM), and RAM.

In other embodiments of the invention, files comprising the set of computer-executable instructions may be stored in computer-readable memory on a single computer or distributed across multiple computers. A skilled artisan will further appreciate, in light of this disclosure, how the invention can be implemented, in addition to software, using hardware or firmware. As such, as used herein, the operations of the invention can be implemented in a system comprising any combination of software, hardware, or firmware.

Embodiments of the invention include one or more computers or devices loaded with a set of the computer-executable instructions described herein. The computers or devices may be a general purpose computer, a special-purpose computer, or other programmable data processing apparatus to produce a particular machine, such that the one or more computers or devices are instructed and configured to carry out the calculations, processes, and operations of the invention. The computer or device performing the specified calculations, processes, and operations may comprise at least one processing element such as a central processing unit (i.e. processor) and a form of computer-readable memory which may include random-access memory (RAM) or read-only memory (ROM). The computer-executable instructions can be embedded in computer hardware or stored in the computer-readable memory such that the computer or device may be directed to perform one or more of the processes and operations depicted in the block diagrams and/or described herein.

Controller

An exemplary embodiment of the invention includes a single computer or device that may be configured at a photovoltaic plant to serve as a controller. The controller may comprise at least one processor, a form of computer-readable memory, and a set of computer-executable instructions for performing one or more of the calculations, processes, and operations described and/or depicted herein. The single computer or device may be configured at a photovoltaic plant to serve as a controller which receives feedbacks from the inverters and the site power meter and sends a site real power limit command and an inverter real power limit command through a network to one or more inverters of the renewable energy site. For example, a photovoltaic plant may comprise a plurality of solar ware stations comprising at least two inverters. The solar ware stations of the system may be interconnected using Ethernet connectivity wherein data is transmitted between stations through a Modbus TCP protocol. Commands and feedbacks may be sent to and from the inverters through a network interface such as an Ethernet switch. However, any suitable network protocol, including IP, UDP, or ICMP, as well any suitable wired or wireless network including any local area network, Internet network, telecommunications network, Wi-Fi enabled network, or Bluetooth enabled network may be used. The controller may be configured at one solar ware station to control the inverters based on the forecasted fluctuations in solar irradiance as well as receive inputs from the inverters and from the site meter. The controller may also allow an operator to control the power at the renewable energy site through an operator interface which may be a graphical user interface (GUI) which may be present at the Main Site Controller itself or be presented as an HTTP webpage that may be accessed by the operator at a remote general purpose computer with a processor, computer-readable memory, and standard I/O interfaces such as a universal serial bus (USB) port and a serial port, a disk drive, a CD-ROM drive, and/or one or more user interface devices including a display, keyboard, keypad, mouse, control panel, touch screen display, microphone, etc. for interacting with the controller through the GUI.

Provided is a control system for photovoltaic power plants that is able to respond to predicted changes in power output due to a change in surface irradiance. When it is determined that power output of the power plant will change above or below a desired threshold, ramp rates of the power plant can be altered accordingly to compensate for such changes (e.g., ramp up or ramp down).

Since grids to which power plants provide power do not perform well when power output suddenly increases or decreases, control of upward and downward ramp rates is highly desired. According to embodiments of the invention, steps can be taken to mitigate the total fluctuation expected in response to predictions in fluctuations in solar irradiance. For example, power output can be proactively reduced before a downward trend begins, or the upward ramp rate can be limited before an upward trend begins. Such active management of power output of the photovoltaic power plant can result in achieving goals of providing power within acceptable limits. In particular, the power output from the photovoltaic plant can be reduced in advance to prevent negative effects as clouds cover the photovoltaic cells of the power plant. In a power plant with a plurality of inverters for example the ramp rate of individual inverters can be limited, or controlled in a manner to prevent the inverter from contributing to the overall output of the plant, such as by disconnecting selected inverters, diverting the power output of individual inverters to another purpose, and/or by selectively turning individual inverters off. In embodiments, the total power output of the plant can be controlled such that various inverters are selectively switched on or off. Alternatively or in addition, one or more inverter could be controlled in a manner to drop in power output while other inventors could have an increase in power output. A central control system in embodiments would be desirable for monitoring and/or controlling all inverters individually or globally to regulate power output of the plant at a given time.

Embodiments of the invention may be used in combination with other power control methods for photovoltaic power plants, including those described in U.S. patent application Ser. No. 13/921,788 and U.S. patent application Ser. No. 14/050,928. These include sending an inverter reactive power command or an inverter power limit command to one or more of the inverters at the photovoltaic power plant.

EXAMPLE

A Micropulse LIDAR ceilometer and 35.5 GHz RADAR station are stationed 5.2 miles and 5.8 upwind from the 56.16-kW photovoltaic solar power plant at Vermejo Ranch in Northern New Mexico. The photovoltaic generating plant has battery storage and generator backup. The LIDAR and RADAR sensors receive information from a backscattered or reflected signal from a large cumulonimbus cloud passing overhead at 1:23 pm and send the information as machine-readable data to a processor which determines the range, elevation, altitude, azimuth, ceiling, and height of the approaching cumulonimbus cloud according to appropriate algorithms. The processor then uses this information to create a 3D representation of the cloud, and combines that information with almanac information for Vermejo Ranch stored in a database to create a 2D surface irradiance map. The processor then receives machine-readable data from an anemometer on wind speed and direction, and combines this information with the 2D surface irradiance map to forecast a reduction in surface irradiance resulting from passage of the cloud over the photovoltaic plant, which based on wind speed data is calculated to occur between 1:46 pm and 2:14 pm, reaching a peak reduction of surface irradiance of 63%. The processor then sends a signal to one or more inverters to gradually reduce the power output in anticipation of the reduction in surface irradiance while optionally simultaneously sending a signal for the photovoltaic plant to make up for the loss in power by drawing on the power in the battery. When the cloud has passed over the photovoltaic power plant the processor sends a signal to the inverters to gradually ramp up the power output back to maximum output while correspondingly reducing the power output from the battery.

The present invention has been described with reference to particular embodiments having various features. In light of the disclosure provided above, it will be apparent to those skilled in the art that various modifications and variations can be made in the practice of the present invention without departing from the scope or spirit of the invention. One skilled in the art will recognize that the disclosed features may be used singularly, in any combination, or omitted based on the requirements and specifications of a given application or design. Other embodiments of the invention will be apparent to those skilled in the art from consideration of the specification and practice of the invention.

It is noted in particular that where a range of values is provided in this specification, each value between the upper and lower limits of that range is also specifically disclosed. The upper and lower limits of these smaller ranges may independently be included or excluded in the range as well. The singular forms "a," "an," and "the" include plural referents unless the context clearly dictates otherwise. It is intended that the specification and examples be considered as exemplary in nature and that variations that do not depart from the essence of the invention fall within the scope of the invention. Further, all of the references cited in this disclosure, such as non-patent literature, pending patent application, published patent applications, and published patents, are each individually incorporated by reference herein in their entireties and as such are intended to provide an efficient way of supplementing the enabling disclosure of this invention as well as provide background detailing the level of ordinary skill in the art.

The invention claimed is:

1. A method for controlling power output of a photovoltaic power plant, comprising:
   receiving machine-readable data on one or more clouds from one or more sensors within a radius of a photovoltaic power plant;
   retrieving machine-readable data from a database on the elevation and azimuth of the sun corresponding to each location of, and a time of measurement by, the one or more sensors;
   creating a three-dimensional map of one or more target clouds based on one or more three-dimensional characteristics;
   determining, through the machine-readable data received from the one or more sensors, positions of the one or more target clouds at selected points in time;
   determining velocity vectors of the one or more target clouds based on the positions;
   projecting a two-dimensional surface irradiance map based on the three-dimensional map and machine-readable data on the elevation and azimuth of the sun;
   forecasting from the two-dimensional surface irradiance map over time an increase or decrease in surface irradiance; and
   in response to a result of the forecasting, controlling the power output at the photovoltaic power plant by adjusting the power output of the photovoltaic power plant and/or by drawing power from a secondary power producing resource;
   wherein at least one of the determining, creating, projecting, and forecasting steps are carried out through a computer processor.

2. The method of claim 1, wherein the velocity vectors of the one or more target clouds are computed by comparing two of more three-dimensional maps.

3. The method of claim 1, wherein the controlling is (i) configured to decrease a power output of one or more inverters in anticipation of a decrease in solar irradiance at the photovoltaic power plant, or (ii) configured to increase the power output of the inverters in anticipation of an increase in solar irradiance at the photovoltaic power plant.

4. The method of claim 1, wherein the one or more sensors are LIDAR, RADAR, or infrared or visual sensors.

5. The method of claim 4, wherein the visual sensor records an image of the sky.

6. The method of claim 1, wherein the one or more three-dimensional characteristics include a range, altitude, elevation, or azimuth of a target cloud.

7. The method of claim 1, wherein at least one of the sensors is an anemometer and the velocity vectors of the one or more clouds are determined through wind speed and direction measured by the anemometer.

8. The method of claim 1, wherein the one or more three-dimensional characteristics include macrophysical properties of the one or more clouds, where the macrophysical properties are selected from one or more of cloud base height, cloud width, cloud fraction, cloud top height, cloud density, and cloud type.

9. A non-transitory computer-readable medium including instructions that, when executed on a computer, cause a computer to:
   receive machine-readable data on one or more clouds from one or more sensors within a radius of a photovoltaic power plant;
   retrieve machine-readable data from a database on the elevation and azimuth of the sun corresponding to each location of, and a time of measurement by, the one or more sensors;
   create a three-dimensional map of one or more target clouds based on one or more three-dimensional characteristics;
   determine, through the machine-readable data received from the one or more sensors, positions of the one or more target clouds at selected points in time;
   determine velocity vectors of the one or more target clouds based on the positions;
   project a two-dimensional surface irradiance map based on the three-dimensional map and machine-readable data on the elevation and azimuth of the sun; and
   forecast from the two-dimensional surface irradiance map over time an increase or decrease in surface irradiance.

10. The non-transitory computer-readable medium of claim 9, further comprising instructions that cause a computer to send a command to one or more inverters at the photovoltaic power plant to adjust power output of the photovoltaic plant, wherein the command is (i) configured to decrease a power output of one or more inverters in anticipation of a decrease in solar irradiance at the photovoltaic power plant, or (ii) configured to increase the power output of the inverters in anticipation of an increase in solar irradiance at the photovoltaic power plant.

11. The non-transitory computer-readable medium of claim 9, wherein the one or more sensors are LIDAR, RADAR, or infrared or visual sensors.

12. The non-transitory computer-readable medium of claim 11, wherein the visual sensor records an image of the sky.

13. The non-transitory computer-readable medium of claim 9, wherein the one or more three-dimensional characteristics include a range, altitude, elevation, or azimuth of a target cloud.

14. The non-transitory computer-readable medium of claim 9, wherein one of the sensors is an anemometer and the velocity vectors of the one or more clouds is determined through wind speed and direction measured by the anemometer.

15. The non-transitory computer-readable medium of claim 9, wherein the one or more three-dimensional characteristics include macrophysical properties of the one or more clouds, where the macrophysical properties are selected from one or more of cloud base height, cloud width, cloud fraction, cloud top height, cloud density, and cloud type.

16. A photovoltaic power plant controller device comprising:
   at least one processor;
   a form of computer-readable memory; and
   a set of computer-executable instructions configured to:
   receive machine-readable data on one or more clouds from one or more sensors within a radius of a photovoltaic power plant;

retrieve machine-readable data from a database on the elevation and azimuth of the sun corresponding to each location of, and a time of measurement by, the one or more sensors;

create a three-dimensional map of one or more target clouds based on one or more three-dimensional characteristics;

determine, through the machine-readable data received from the one or more sensors, positions of the one or more target clouds at selected points in time;

determine velocity vectors of the one or more target clouds based on the positions;

project a two-dimensional surface irradiance map based on the three-dimensional map and machine-readable data on the elevation and azimuth of the sun;

forecast from the two-dimensional surface irradiance map over time an increase or decrease in surface irradiance; and adjust the power output of the photovoltaic plant and/or draw power from a secondary power producing resource based on the forecasted decrease or increase of surface irradiance at the photovoltaic power plant.

17. The photovoltaic power plant controller device of claim 16, wherein the set of computer-executable instructions is configured to send a command to one or more inverters at the photovoltaic power plant, wherein the command is (i) configured to decrease a power output of one or more inverters in anticipation of a decrease in solar irradiance at the photovoltaic power plant, or (ii) configured to increase the power output of the inverters in anticipation of an increase in solar irradiance at the photovoltaic power plant.

18. A system comprising the photovoltaic power plant controller device of claim 16 comprising one or more inverters in a two-way communication with the photovoltaic power plant controller through a network.

* * * * *